United States Patent [19]
Miyamura et al.

[11] 3,890,199
[45] June 17, 1975

[54] PROCESS FOR THE PRODUCTION OF BICYCLOMYCIN

[75] Inventors: Sadao Miyamura; Nagahiro Ogasawara, both of Niigata; Hitoshi Otsuka, Kurosaki, all of Japan

[73] Assignee: Japan Antibiotics Research Association, Tokyo, Japan

[22] Filed: Aug. 8, 1973

[21] Appl. No.: 386,852

[30] Foreign Application Priority Data
Aug. 8, 1972   Japan ............................. 47-79806

[52] U.S. Cl. ............................................. 195/80 R
[51] Int. Cl. ............................................. C12d 9/00
[58] Field of Search ................................ 195/80 R

[56] References Cited
FOREIGN PATENTS OR APPLICATIONS
2,150,593   4/1972   Germany ..................... 195/80 R Primary Examiner—Lionel M. Shapiro
Assistant Examiner—Robert J. Warden
Attorney, Agent, or Firm—James C. Haight

[57] ABSTRACT

Antibiotic No. 5879 which is a water-soluble and weakly basic antibiotic effective against gram-negative bacteria is produced by the cultivation of a new microorganism, Streptomyces aizunensis nov. sp. Antibiotic No. 5879 is the same substance as the known antibiotic WS-4545 which is disclosed in German "DTOS" (Offenlegungsschrift) No. 2,150,593.

4 Claims, 1 Drawing Figure

PROCESS FOR THE PRODUCTION OF BICYCLOMYCIN

BACKGROUND OF THE INVENTION

This invention relates to a process for the production of Antibiotic No. 5879.

Many efforts have been made to provide a new antibiotic which is useful as a medicine and/or pesticide or for other purposes. In an attempt to obtain a new antibiotic, we have collected various soil samples, isolated microorganisms from such soil samples and investigated metabolism products produced by such microorganisms.

We isolated a new microorganism from a soil sample collected in the Aizu area of Fukushima Prefecture, Japan, and we have confirmed that this microorganism designated as the strain No. 5879 is a new species of the genus Streptomyces. Furthermore, we have found that an antibiotic substance is produced and accumulated in a culture broth of the strain No. 5879. We have succeeded in isolating this antibiotic substance from the culture broth, and we designated this substance as "Antibiotic No. 5879". We have also found that this Antibiotic No. 5879 substance is effective against gram-negative bacteria. We initially considered this antibiotic a new substance not heretofore known. As a result of our further investigation on Antibiotic No. 5879, however, it is revealed that Antibiotic No. 5879 is the same substance as a known antibiotic substance called "Antibiotic WS-4545" which is described in West Germany DTOS specification No. 2,150,593 published on Apr. 13, 1972. Antibiotic WS-4545 is now called "bicyclomycin" and identified as 8, 10-diaza-6-hydroxy-5-methylene-1-(2'-methyl-1',2',3'-trihydroxypropyl)-2-oxabycyclo[4,2,2]decan-7,9-dione and may be represented by the following chemical formula:

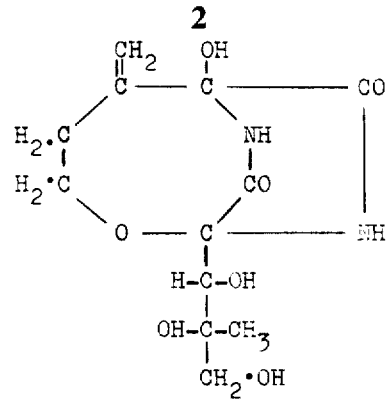

According to the DTOS specification No. 2,150,593, Antibiotic WS-4545 is produced by culturing a microorganism, initially designated as Streptomyces WS-4545 and now designated as *Streptomyces sapporonensis*, which is evidently differentiated from the aforesaid strain No. 5879.

OBJECTS AND SUMMARY OF THE INVENTION

An object of this invention is to provide a new process for the production of a known antibiotic substance designated by us as Antibiotic No. 5879 and identifiable as the known Antibiotic WS-4545, by culturing a new microorganism which is of a new species of the genus Streptomyces. Other objects of this invention will be clear from the following descriptions.

The microbiological characteristics of the strain No. 5879 are as follows:

I. Cultural characteristics of the strain No. 5879 on various culture media are tabulated in Table 1 below. The characteristics shown in Table 1 are the observations made after incubation of the strain No. 5879 was conducted for 10 – 14 days at 30°C. unless otherwise be stated.

Table 1

| Culture medium | Growth | Reverse side of Growth | Aerial mycelium | Soluble pigment |
|---|---|---|---|---|
| Sucrose-nitrate-agar | White, slightly faint growth | White | White, powdery | None |
| Glucose-asparagine-agar | White, spreading growth | Pale yellowish white | Pale brownish gray, and white powdery in parts | Pale yellow |
| Glycerin-asparagine-agar | White growth | Pale yellow | Yellowish white, powdery | Pale yellow |
| Starch-agar | Transparent, small colonies | Pale yellow | Grayish white with yellowish tinge, powdery | Pale yellow |
| Tyrosine-agar | Yellow growth | Yellow with brownish tinge | Gray with pinkish tinge, powdery | Pale brownish yellow |
| Nutrient agar | Pale yellow, small colonies | Pale yellow | None | None |
| Yeast-malt extract-agar | Pale yellow growth | Pale brown | Pale pinkish gray, powdery | Brown |
| Oatmeal-agar | Pale yellow, small colonies | Pale yellow | Gray, powdery | None |
| Peptone-yeast extract iron-agar | Transparent, faint growth | Gray | None | Dark brown |
| Carrot plug | No growth | — | — | — |
| Cellulose | No growth | — | — | — |
| Egg albumin | White | White | Grayish white | None |
| Potato plug | Yellow, elevated growth | Gray | None | None |
| Loeffler's coagulated serum | Pale yellow, small colonies | Yellow | None | None |
| Corn steep liquor | No growth | — | — | — |
| Egg | Blackish brown | — | None | Brown |
| Skimmed milk | Pale yellowish white, growth at surface | Pale brown | None | None |

Table 1—Continued

| Culture medium | Growth | Reverse side of Growth | Aerial mycelium | Soluble pigment |
|---|---|---|---|---|
| Glucose-peptone-gelatine | No growth | — | — | — |
| Glucose Czapek's solution | White, faint growth | White | None | None |
| Glucose-bouillon | Pale brown, small colonies | Pale brown | None | None |
| Starch-agar | Transparent growth | Pale yellow | White, powdery | None |

II. Pysiological characteristics of the strain No. 5879 are listed below:

| | |
|---|---|
| Optimum temperature for growth: | 25°C – 30°C (No growth at 37°C) |
| Optimum pH range for growth: | 6 – 8 |
| Peptonization of skimmed milk: | Positive |
| Coagulation of skimmed milk: | Positive |
| Formation of tyrosinase: | Negative |
| Hydrolysis of starch: | Positive |
| Liquefaction of gelatin: | Negative |
| Production of nitrous acid from nitrate: | Positive |
| Cellulose decomposition: | Negative |
| Formation of hydrogen sulfide: | Negative |
| Formation of indol: | Negative |
| Production of acetyl methyl carbinol: | Positive |

III Sugar utilization of the strain No. 5879 was examined according to Pridham & Gottlieb's method described in the "Journal of Bacteriology" Vol. 56, page 107 (1948). The results are shown below.

1. Carbon sources easily utilizable: glucose, fructose, xylose, arabinose, starch and mannose,
2. Carbon sources less utilizable: raffinose.
3. Carbon sources not utilized: saccharose, rhamnose, mannitol and inositiol.

IV. Taxonomic characteristics of the strain No. 5879 are given as follows: When the aerial hyphae grown on the glucose-asparagine-agar medium and on the starch-agar medium are observed under a microscope, straight and wavy aerial mycelia are observed. No formation of spiral and whorl is observed. The Sporophores are terminated by a chain of conidia. Neither sporangium nor sclerotium nor zoospore is observed, demonstrating that the strain No. 5879 belongs to the genus Streptomyces. Conidia are elliptical to spherical in shape and measure 0.6 – 0.8 $\mu$ by 1.0 – 1.3$\mu$ in size. The surface appearance of the conidia is smooth under an electron-microscope.

From the above observations, the taxonomic characteristics of the strain No. 5879 may be summarised as follows:

1. Straight and wavy aerial mycelia are observed, but neither spiral nor whorl is observed. Conidia are elliptical to spherical in shape and smooth at the surface thereof.
2. The substrate growth is white to yellow in color, but is brown in some parts. The aerial mycelia on most of the media are white to yellow or pale pinkish gray in color, and the reverse side of the colonies is white to yellow or brown in color. The soluble pigment is yellow or yellowish on most of the media, but pale brown pigment is produced when grown on yeast-malt-agar medium, peptone-yeast extract-iron-agar medium and tyrosine-agar medium.
3. The starch-hydrolyzing activity is high but the proteolytic activity is not high.

When reference is made to the disclosure in S.A. Wacksman's "The Actinomycetes" Vol. 2 (19610 and in the "Journal of Antibiotics" which describe new species of Streptomyces and antibiotics produced by the Streptomyces species, it is found that the strain No. 5879 resembles *Streptomyces griseolus* and *Streptomyces flavorgriseus*. However, the strain No. 5879 is differentiated from *Streptomyces griseolus* in that the strain No. 5879 does not liquefy gelatine but slightly acidifies litmus-milk medium and gives different observations on the nutrient agar medium from those of *Streptomyces griseolus*. Furthermore, the strain No. 5879 is differentiated from *Streptomyces flavogriseus* in that the strain No. 5879 produces elliptical to spherical conidia and gives different observations on potato plug, nutrient agar medium and starch agar medium. The differences in taxonomic properties mentioned above between those of the recognised species in the genus Streptomyces are considered to be significant enough to propose the new species *Streptomyces aizunensis* nov. sp. for the strain No. 5879.

This microorganism *Streptomyces aizunensis* was deposited under a deposit number FERM-P No. 1501 on July 31, 1972 in a Japanese public depository "Fermentation Research Institute, Agency of Industrial Science and Technology", Inage, Chiba city, Japan. The microorganism was also deposited with the American Type Culture Collection, Rockville, Md. on Aug. 8, 1973 and is available from ATCC under the designation ATCC 21,965.

According to the present invention, therefore, there is provided a process for the production of Antibiotic No. 5879, which comprises cultivating a strain of Streptomyces aizunensis identified as FERM-P No. 1501 under aerobic conditions in a culture medium containing assimilable carbon and nitrogen sources to produce and accumulate the Antibiotic No. 5879 in the culture, and then recovering this antibiotic substance from the culture.

DETAILED DISCUSSION

Figure 1:
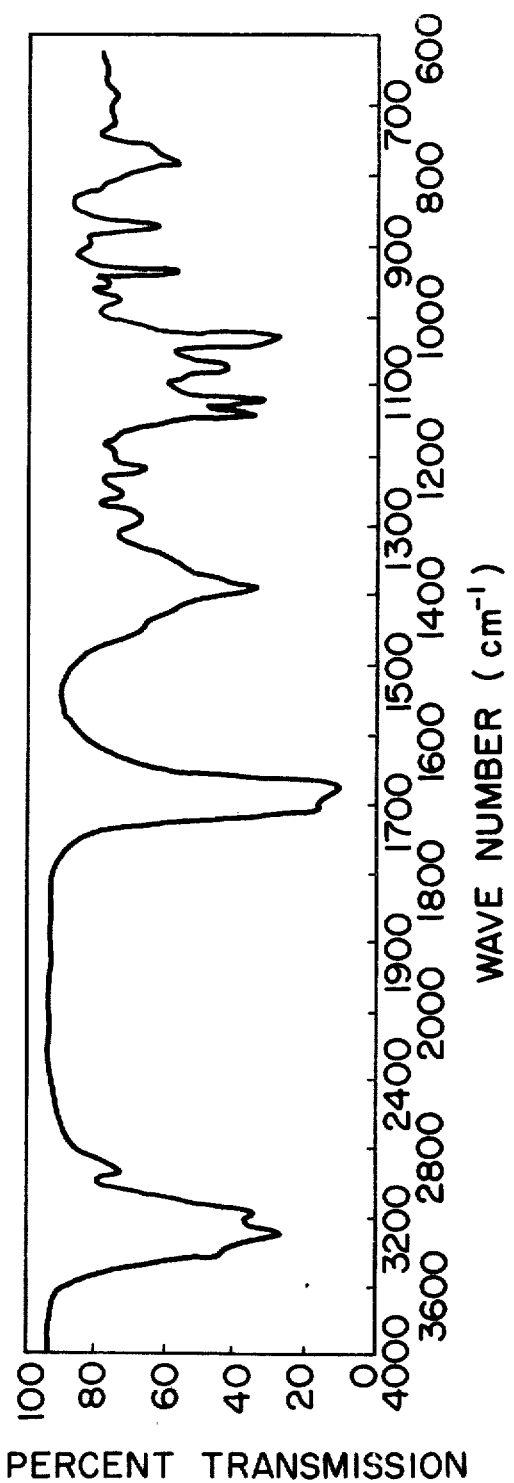
FIG. 1 is the infrared spectrum of Antibiotic No. 5879 produced by the process of the present invention.

In the process of the present invention, a strain of *Streptomyces aizunensis* and particularly the strain No. 5879 may be cultivated in a known manner under aerobic conditions in a culture medium containing such carbon and nitrogen sources which may be utilized as nutrients by usual microorganisms. As the carbon and nitrogen sources may be employed any of those which have commonly been used in the cultivation of the known strains of Streptomyces. For instance, glucose, starch, sucrose, starch syrup, molasses and the like are useful as the carbon source. Further, meat extract, peptone, gluten meal, defatted cotton seed, soybean meal, corn steep liquor, dried yeast, ammonium sulfate, urea and the like are useful as the nitrogen source, either organic or inorganic. If required, inorganic salts such as calcium carbonate, sodium chloride, potassium chloride, iron sulfate, magnesium sulfate, nickel chloride and phosphates may be added to the culture medium. Furthermore, a de-foaming agent such as silicone, vegetable oil or mineral oil may be added to the culture medium in case the culture medium would be strongly foamed during the cultivation of the microorganism.

As the method of cultivating *Streptomyces aizunensis*, liquid cultivation methods and particularly liquid cultivation method under submerged aerobic conditions are most preferred, as with the common processes of producing the known antibiotics. In the process of the present invention, the cultivation may suitably be effected under aeration a suitable incubation temperature is at 30°C or in the vicinity of 30°C. It is preferred to prepare a seed culture or inoculum and then inoculate this to a greater volume of the culture medium for use in the commercial production of the antibiotic No. 5879. Suitable incubation times arl in a range of 30–100 hours. Optimum incubation conditions may vary depending on the particular strain employed.

Antibiotic No. 5879 thus produced and accumulated in the culture by the cultivation of *Streptomyces aizunensis* is mainly present dissolved in the liquid phase of the culture broth, but is also present in the mycelium of the microorganism. Accordingly, the culture broth is centrifuged or filtered to collect the mycelium cake and the broth filtrate. The active substance may be then recovered from the mycelium cake and the broth filtrate, respectively, by extracting with a suitable organic solvent or by adsorbing with a suitable cation-exchange resin in a manner known in the production of the known water-soluble, basic antibiotics.

For the recovery and purification of Antibiotic No. 5879, there may generally be applied any known process in which the solubility of an antibiotic in a suitable solvent is utilized; a known process in which the difference in the solubilities of different antibiotics in a suitable solvent is utilized; a known process in which the crystallizability of an antibiotic from a solution thereof in a suitable solvent is utilized; a known process in which the difference in the crystallizabilities of different antibiotics from a solvent of them in a suitable solvent is utilized; a known process in which the absorption of an antibiotic by an adsorbent is utilized; and a known process in which the difference in the distribution of an antibiotic between two suitable solvents is utilized.

In general, for the recovery of Antibiotic No. 5879 from the culture broth of the strain No. 5879, it is effective to filter the culture broth, collect the filtrate (that is, the liquid phase of the culture broth) separately from the filter cake (that is, the solid phase of the broth comprising the mycellium cake), pass the filtrate through a column of a cation-exchange resin such as a sulfonated polystyrene resin and a sulfonated copolymer of styrene and divinylbenzene for the adsorption of the antibiotic by the resin, and then pass a stream of hydrochloric acid through the resin column for elution. The antibiotic-containing active fractions of the eluate may be evaporated in vacuo to give a crude powder of Antibiotic No. 5879. For the purification of a crude powder of Antibiotic No. 5879 so obtained, it may be chromatographed on cellulose, silica gel or alumina. In this way, Antibiotic No. 5879 may be obtained in the form of a colorless pure product.

It is preferred to carry out the recovery and purification of Antibiotic No. 5879 in the following way: The culture broth of the strain No. 5879 is acidified to pH 2 by addition of hydrochloric acid, filtered to remove the precipitate, and then the acidic filtrate is adjusted to pH 8 by addition of an anion-exchange resin such as quaternary ammonium hydroxide derivative of polystyrene containing $-N-(CH_3)_3OH$ as the functional group of the resin (for example, a product commercially available under a trade name "Amberlite IRA-400") or a weakly basic anion-exchange resin consisting of a polyaminated phenolformaldehyde resin (for example, a product commercially available under a trade name "Daiaion A-6") under stirring. After the removal of the anion-exchange resin by filtration, the filtrate is passed through a column of a cation-exchange resin such as a copolymer of methacrylic acid and divinylbenzene (for example, a product commercially available under a trade name "Amberlite IRC-50" of $H^+$cycle). The column is washed with water and 0.01N hydrochloric acid, and the antibiotic is eluted with 0.5N hydrochloric acid. Fractions containing strong activity are pooled, neutralized to pH 7 by mixing with the anion-exchange resin and then filtered. The filtrate is concentrated under reduced pressure, and the concentrated solution is then freeze-dried. This powder is extracted with approximately 5 volumes of 50% aqueous ethanol, and the aqueous ethanol is filtered to separate the residues. After concentration of the filtrate, the resulting solution is adjusted to pH 8 with dilute aqueous sodium hydroxide and passed through a column of activated charcoal. The column is washed with water, and the antibiotic is eluted with 80 % aqueous ethanol. The crude antibiotic is isolated as an off-white powder by lyophilization of combined fractions. Further purification is effected by chromatography on cellulose powder using water-saturated n-butanol for elution. The material recovered from the active fraction is further purified by means of preparative thin-layer chromatography on silica gel in the n-butanol-methanol system (9:1). The antibiotic-containing portion of the absorbant is scraped from the glass plate, and the antibiotic adsorbed on the silica gel is eluted by repeated swirling and centrifuging in 50% aqueous methanol. The aqueous methanol containing the antibiotic is evaporated in vacuo to dryness. The resulting purified powder is dissolved in a small volume of methanol. This solution is mixed with approximately 10 volumes of acetone, concentrated under reduced pressure until crystallization occurred, and the mixture is then refrigirated overnight. The crude crystalline antibiotic is recrystallized from a mixture of methanol and acetone to yield colorless prisms.

The physical and chemical properties of Antibiotic No. 5879 are given below. Antibiotic No. 5879 is a watersoluble and weakly basic substance and has been confirmed to be the substance identical to the Antibiotic WS-4545 disclosed in the "DTOS" specification No. 21 50 593 as mentioned above.

Antibiotic No. 5879 forms colorless prism-shaped crystals, melts at 170° – 171°C (decomp.) and gives $[\alpha]_D^{31}$ +82.6° (C 0.6366, $H_2O$). It is easily soluble in water, soluble in methanol and scarcely soluble in ethanol. The molecular weight was estimated to be 302 by isothermal distillation and the elemental analysis suggested to be $C_{12}H_{18}N_2O_7$ for its molecular formula.

| Analysis: | Calcd. for $C_{12}H_{18}N_2O_7$: |
|---|---|
|  | C 47.76, H 6.01, N 9.27% |
| Found: | C 47.86, H 6.05, N 9.17% |

The ultraviolet absorption spectrum exhibits only end absorption. The infrared spectrum measured in a KBr tablet is shown in FIG. 1. The mass spectrum could not be obtained because of pyrolysis of this antibiotic during the measurement. The Ninhydrin test is only positive after degrading the antibiotic with 0.1N aqueous potassium hydroxide at room temperature overnight. Both ferric hydroximate and the vic-diol splitting test with periodic acid are positive.

The antibiotic spectrum obtained by the agar dilution method is shown in Table 2. Antibiotic No. 5879 is especially effective against gram-negative bacteria. The intra-peritoneal injection of 400 mg/kg to mice did not exhibit any toxicity.

Table 2

Antibacterial spectrum of
Antibiotic No. 5879

| Test organism* | Minimal inhibitory concentration (mcg/ml) |
|---|---|
| Staphylococcus aureus FDA 209P | 500 |
| Sarcina lutea PCI 1001 | 62.5 |
| Bacillus anthracis 1 | >500 |
| Bacillus subtilis ATCC 6633 | >500 |
| Pseudomonas aeruginosa 35 | >500 |
| Klebsiella pneumoniae S | 15.6 |
| Salmonella typhosa 376 | 15.6 |
| Salmonella enteritidis NG 567 | 7.8 |
| Escherichia coli B | 31.2 |
| Escherichia coli K-12 | 31.2 |
| Shigella flexneri 3a 3196 | 15.6 |
| Shigella sonnei R-1 | 15.6 |
| Brucella melitensis K-3 | 0.9 |
| Vibrio comma 384 | 3.9 |
| Proteus vulgaris X-19 | >500 |
| Serratia marcescens 2 | >500 |
| Mycobacterium phlei 607 | >500 |
| Morganella 3 | >500 |
| Rettgerella 15 | >500 |

*Heart infusion agar, 37°C, 24 hours.

Antibiotic No. 5879 is an antibiotic substance active against gram-negative bacteria such as *Escherichia coli*, Klebsiella, and Salmonella, but inactive against *Staphylococcus aureus*, *Pseudomonas aeruginosa* and gram-positive bacteria. It has been found that Antibiotic No. 5879 is effective subcutaneously in curring *Escherichia coli* infections in mice. Antibiotic No. 5879 may be formulated as an aqueous solution for injection and may be intramuscularly or intravenously injected in mice, rats, rabbits and dogs as well as in men.

The present invention is now illustrated with reference to the following Example to which the present invention is not limited.

EXAMPLE

Ten litres of a culture medium comprising 1% glucose, 1.5% starch, 2% soybean meal, 0.2% monopotassium phosphate, 0.05% magnesium sulfate, 0.05% potassium chloride and 0.0001% ferrous sulfate (pH 7.0) was placed in each of two fermentation vessels of a 20 litres capacity and fitted with an agitator. The culture medium was sterillized in a conventional manner by heating and then inoculated with *Streptomyces aizunensis* strain No. 5879. The inoculated culture medium was incubated at 30°C for 65 hours under stirring by means of the agitator rotating at a speed of 300 r.p.m., while a stream of sterile air was passed at a rate of 10 l./minute through the culture medium. After the incubation was completed, the culture broth was filtered and the resulting filtrate (18 l.) was adjusted to pH 2 by addition of hydrochloric acid. The acidified filtrate was filtered to remove the precipitate. The filtrate was then adjusted to pH 8-9 by addition of a weakly basic anion-exchange resin consisting of a polyaminated phenolformaldehyde resin (commercially available under a trade name Daiaion A-6). After removing the anion-exchange resin by filtration, the filtrate was passed through a column of a cation-exchange resin consisting of a copolymer of methacrylic acid and divinylbenzene (commercially available under a trade name Amberlite IRC-50 of $H^+$ cycle). The column was washed with distilled water and with 0.01N hydrochloric acid, and the antibiotic was eluted with 5000 ml. of 0.5N hydrochloric acid. The active fractions of the eluate were combined together and adjusted to pH 7 by addition of a weakly basic anion-exchange resin (Daiaion A-6) and the filtered. The filtrate was concentrated under reduced pressure and the concentrated solution was then freeze-dried to give 150 g. of a powder. To this powder (150 g.) was added 600 ml. of 50% aqueous ethanol, and the resulting admixture was agitated for 30 minutes at ambient temperature and then centrifuged to give the solid residue and an extract solution of the antibiotic in 50% aqueous ethanol. The residue was twice extracted with 50% aqueous ethanol to recover an amount of the active substance remaining in said residue. The 50% aqueous ethanol extracts so obtained were combined together and concentrated by distillation of the ethanol under reduced pressure. The concentrated solution was adjusted to pH 5 by addition of hydrochloric acid and then admixed with 10 g. of active carbon, which amounted to 0.5% of the weight of the concentrated solution. The admixture obtained was agitated for 1 minute at ambient temperature and then filtered to remove the carbon. The filtrate was adjusted to pH 7 by addition of the anion-exchange resin (Daiaion A-6), concentrated under reduced pressure and freeze-dried to give 115 g. of a yellowish white powder. 20 Grams of this powder were dissolved in 200 ml. of water, and the solution was adjusted to pH 8 by addition of sodium hydroxide and filtered to remove the precipitate. The filtrate was passed through a column of granular activated carbon for chromatography, so that the active substance was adsorbed by the carbon. The column was washed with distilled water, and the antibiotic was eluted using 800 ml. of 80% aqueous ethanol. The active fractions of the eluate were combined together, concentrated under reduced pressure and dried in vacuo to give 4 g. of a white powder. For further purification, this powder (4 g.) was chromatographed on cellulose powder using water-saturated n-butanol for the elution. The active fractions of the eluate were combined together and concentrated under reduced pressure. The concentrated solution was dried in vacuo to give 1 g. of a white powder. By recrystallizing this powder from hot methanol-acetone, Antibiotic No. 5879 was afforded as a crude crystalline product in a yield of 600 mg. A second recrystallization of this product from hot methanol-acetone gave 200 mg. of Antibiotic No. 5879 in the form of colorless, prism-shaped cyrstal, mp. 170°–171°C.

The preceding example can be repeated with similar success by substituting the generically or specifically described culture media and/or incubation conditions and/or procedures of recovering the antibiotic according to the present invention for those used in the above-mentioned example.

From the foregoing description, one skilled in the art can easily ascertain the essential characteristics of the present invention, and without departing from the spirit and scope thereof, can make various changes and modifications of the invention to adapt it to various usage conditions.

What we claim is:

1. A process for the production of bicyclomycin which comprises cultivating a strain of *Streptomyces aizunensis* identified as ATCC 21,965 under aerobic conditions in a culture medium containing assimilable carbon and nitrogen sources to produce and accumulate bicyclomycin in the culture, and recovering accumulated bicyclomycin from the culture.

2. A process according to claim 1 in which cultivation is conducted at a temperature of about 30° C.

3. A process according to claim 1 in which the cultivation is conducted for 30–100 hours.

4. A process according to claim 3 in which liquid cultivation under submerged aerobic conditions is conducted at a temperature of 25°–30° C. and a pH of 6–8.

* * * * *